United States Patent [19]

Warda et al.

[11] Patent Number: 5,676,338

[45] Date of Patent: Oct. 14, 1997

[54] DEPLOYABLE VEHICLE ELECTRONICS MODULE ASSEMBLY

[75] Inventors: Gary G. Warda, Brighton; Dean A. Stevenson, St. Clair Shores, both of Mich.

[73] Assignee: Ford Motor Company, Dearborn, Mich.

[21] Appl. No.: 562,918

[22] Filed: Nov. 27, 1995

[51] Int. Cl.⁶ .................................................. F16M 11/00
[52] U.S. Cl. ........................ 248/27.1; 248/27.3; 296/37.1
[58] Field of Search .............................. 248/27.1, 27.3, 248/904, 220.22, 224.8, 231.81; 296/37.1

[56] References Cited

U.S. PATENT DOCUMENTS

| | | | |
|---|---|---|---|
| 3,645,353 | 2/1972 | Cope et al. | 248/27 |
| 4,051,916 | 10/1977 | Oda | 248/27.1 |
| 4,392,539 | 7/1983 | Fujii et al. | 180/90 |
| 4,524,933 | 6/1985 | Rouws | 248/27.3 |
| 4,546,850 | 10/1985 | Litner | 248/27.3 |
| 4,784,357 | 11/1988 | Kimura | 248/27.3 |
| 4,993,668 | 2/1991 | Inamura | 248/27.3 |

FOREIGN PATENT DOCUMENTS

| | | |
|---|---|---|
| 2 253 559 | 5/1974 | Germany . |
| 300-462 | 7/1981 | Germany . |
| 1576-403 | 7/1990 | U.S.S.R. . |
| 2162239 | 1/1986 | United Kingdom ................. 248/27.3 |

Primary Examiner—Leslie A. Braun
Assistant Examiner—Kimberly Wood
Attorney, Agent, or Firm—David B. Kelley

[57] ABSTRACT

A deployable electronics module assembly for an instrument panel of an automotive vehicle has a bracket mounted to the instrument panel and an electronics module mounted to the bracket with a set of clips with bendable tabs operative to effect separation of the electronics module from the bracket in response to imposition of a load in excess of a predetermined magnitude.

10 Claims, 4 Drawing Sheets

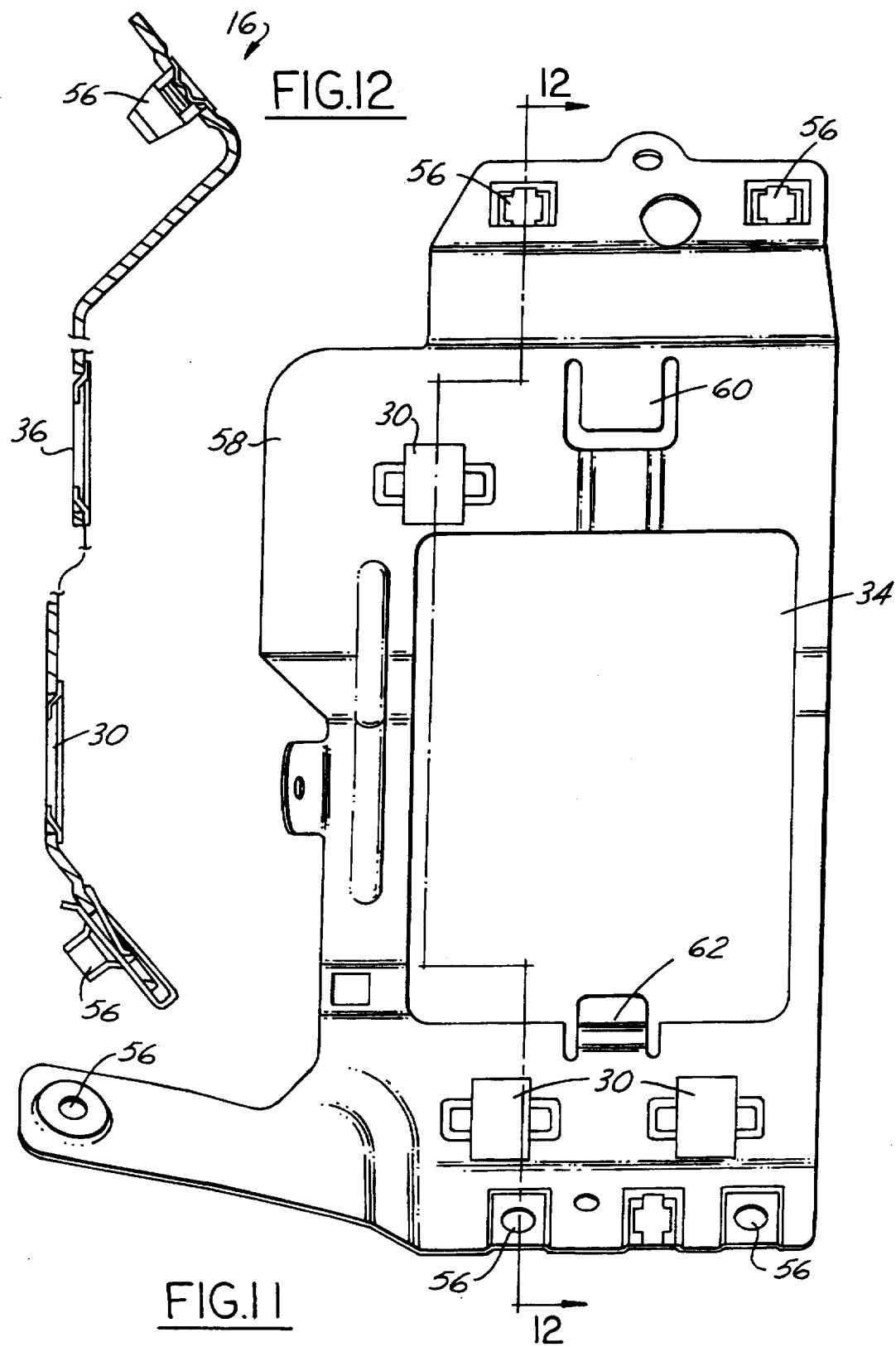

DEPLOYABLE VEHICLE ELECTRONICS MODULE ASSEMBLY

FIELD OF THE INVENTION

The present invention relates to vehicle electronics modules in general, and more specifically to a deployable vehicle electronics module assembly.

BACKGROUND OF THE INVENTION

It is common for a automotive vehicle to have a centralized electronics module which contains, among other things, electronic circuits for regulating and routing electronic signals to appropriate devices throughout the automobile. Such functions may include circuit breakers, fusing/relays, intermittent wiper circuits, warning chimes, and power window/lock circuitry. In many vehicles, the electronics module is located in the instrument panel area so that it is easily accessible from both the engine compartment and the passenger compartment.

The electronics module has typically been packaged and mounted firmly to the instrument panel or surrounding structure to accommodate its weight, which may be from 5 to 10 pounds. Prior packaging typically included, for example, bolting the electronics module to the instrument panel directly, or to a bracket attached to the instrument panel. Such firm mounting requires a large load incident the area proximate the electronics module in order to displace it. Such a mounting may be undesirable, for example, when a load from within the passenger compartment is incident upon the instrument panel.

There is thus a need for a mounting structure which allows deployment of an electronics module away from an instrument on a load incident thereto.

SUMMARY OF THE INVENTION

Responsive to the disadvantages of the related art, the present invention provides a deployable electronics module assembly for an instrument panel of an automotive vehicle. The assembly comprises an electronics module, a bracket mounted to the instrument panel, and a plurality of clips received in corresponding clip openings on the bracket so as to require a predetermined load to release the clips from the openings, and a plurality of fasteners correspondingly connected through each of the clips to the electronics module so as to move through the clip openings upon application of a load equal to or in access of the predetermined load against the instrument panel so as to deploy the electronics module away therefrom.

The clips preferably comprise a base member, at least two fingers extending from the base member, and at least four tabs elevationally spaced with respect to the base member and cooperating with the at least two fingers to retain the base member in one of the clip openings. Upon application of the predetermined load to the instrument panel, the tabs of the clips are bent thus allowing the fasteners and the clips to move through the openings. The electronics module can thus be deployed away from the instrument panel and bracket.

An advantage of the present invention is an electronics module assembly which is deployable away from an instrument panel in response to a predetermined load incident there upon.

A feature of the present invention is a bracket having openings in with clips mounted therein to which an electronics module is attached so that the clips release upon impact of a predetermined load thereto to allow the electronics module to deploy from the bracket.

BRIEF DESCRIPTION OF THE DRAWINGS

These and other objects, advantages, and features of the present invention will be apparent to those skilled in the body arts upon reading the following description with reference to the accompanying drawings, in which:

FIG. 11 is a perspective view of the bracket showing the openings for receiving deployable clips; and FIG. 12 is a sectional view taking along line 12—12 of FIG. 11.

DETAILED DESCRIPTION OF THE PREFERRED EMBODIMENT

Figure 1:
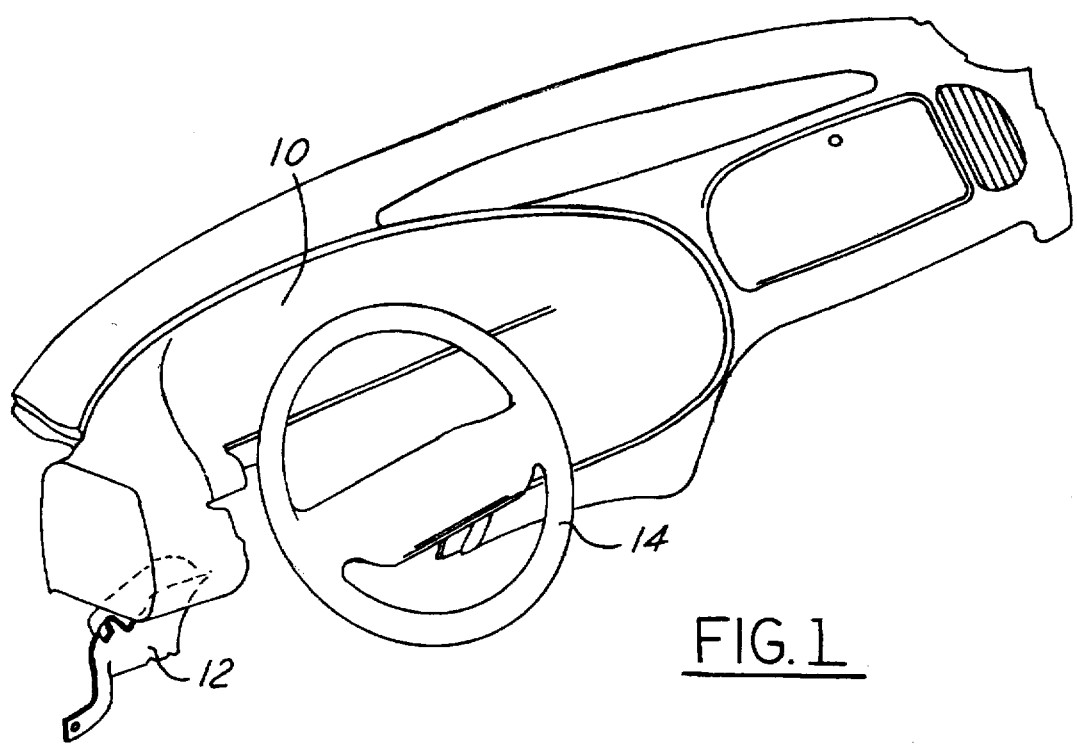
FIG. 1 is a perspective view of an automotive instrument panel showing the location of an electronics module attached to a bracket on the instrument panel.
Figure 2:
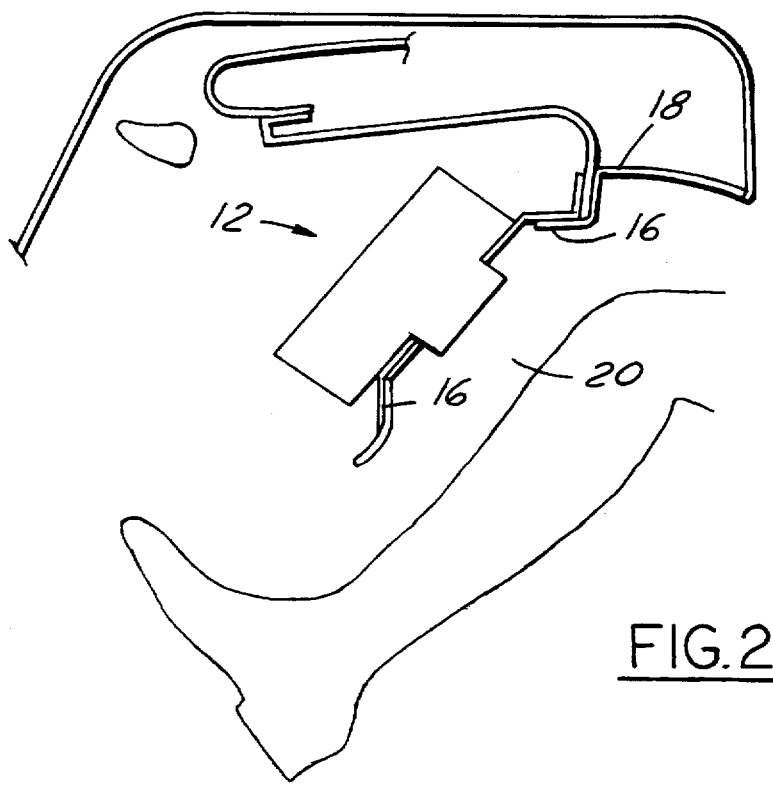
FIG. 2 is a cross-sectional view of an automotive instrument panel showing attachment of an electronics module thereto in a lower area of a passenger compartment.

Turning now to the drawings, and in particular to FIG. 1 thereof, an automotive instrument panel 10 is shown having an electronics module assembly 12 attached thereto in the proximity of a steering wheel 14. It is better seen in FIG. 2, the electronics module assembly 12 is mounted in a bracket 16 attached to an inner surface 18 of the instrument panel 10 so as to be assessable, for example to change a fuse or otherwise maintain the electronics within the electronics module assembly 12, from the leg space 20 beneath the instrument panel 10.

Figure 3:
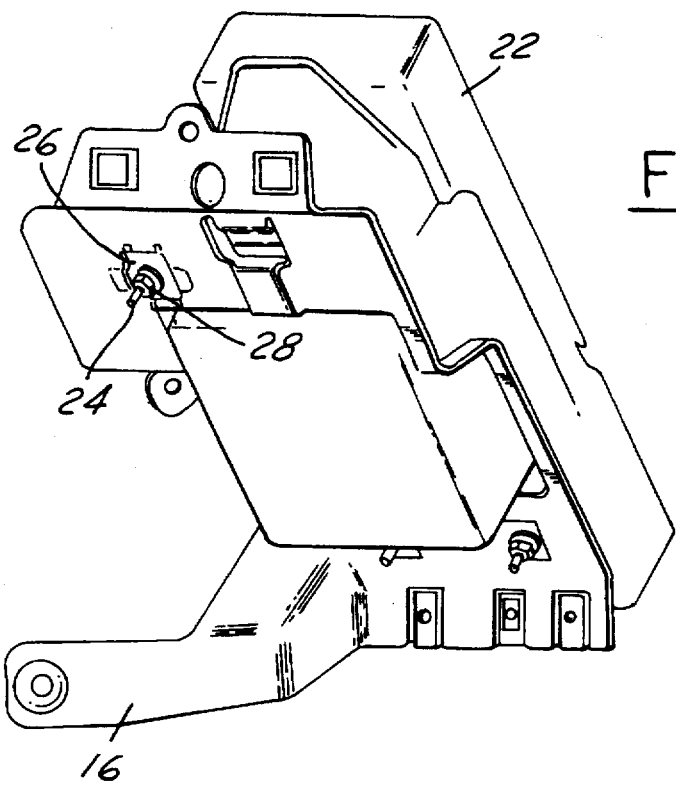
FIG. 3 is a perspective view of an electronics module attached to a bracket having clips mounted therein in accordance with the present invention.
Figure 3A:
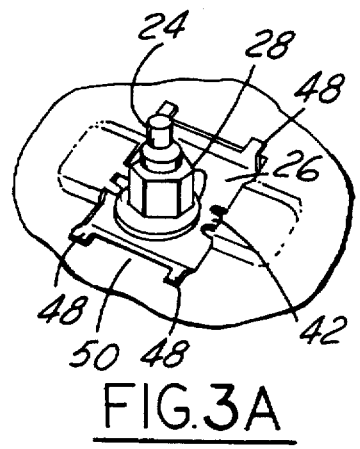
FIG. 3A is a perspective view of a deployable clip attachment on the electronics module of the present invention.
Figure 4:
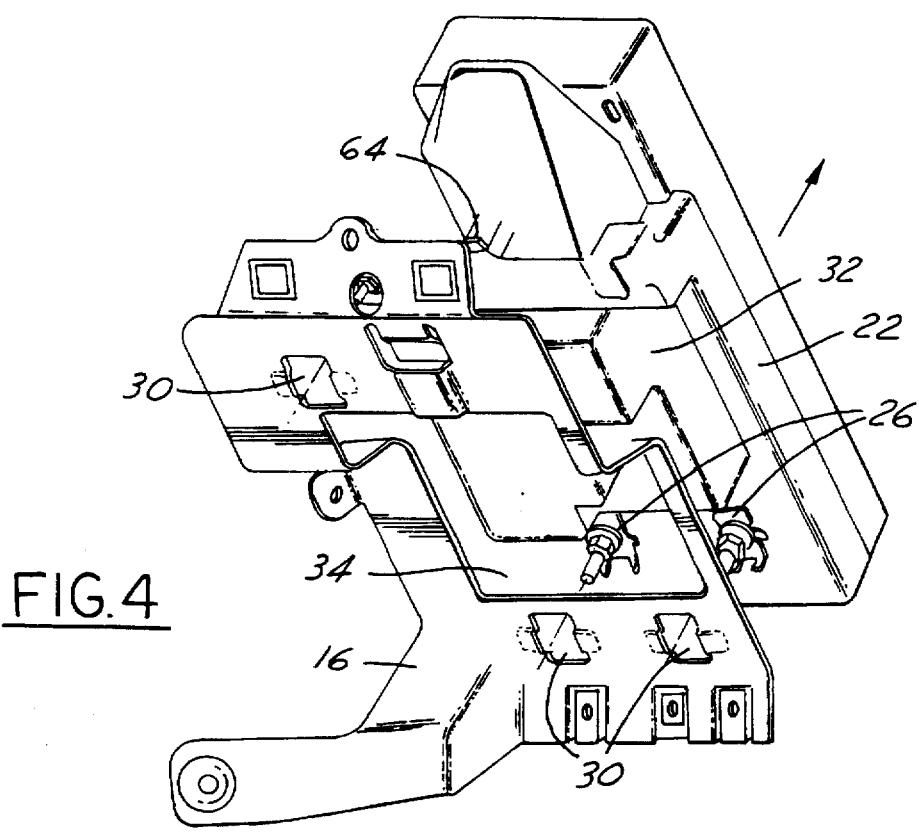
FIG. 4 is perspective view similar to FIG. 3 but showing the electronics module deployed from the instrument panel bracket in accordance with the present invention.

Turning now to FIGS. 3, 3A and 4, the electronics module assembly 12 according to the present invention is shown in greater detail. In FIG. 3, an electronics module 22 is attached to the bracket 16 via bolts 24 which extend through energy management clips 26 attached to the bracket 16 as described below. The bolts 24 are secured to the clips 26 with a nut 28 threadingly attached thereto in a known fashion (FIG. 3A). Those skilled in the art will recognized that other fasteners in addition to the nut 28 and bolt 24 combination may be used so long as the fasteners is capable of moving through clip openings 30 in the bracket 16 (FIG. 4). The electronics module 22 has a removable cap 32 to allow access to the electronics therewithin. The cap 32 fits through an opening 34 in bracket 16. As seen in FIG. 4, the electronics module 22 is deployable from the bracket 16 upon imposition of a load of predetermined force incident upon the instrument panel 10 in the vicinity of the electronics module assembly 12. Deployment of the electronics module 22 away from the bracket 16 occurs when the load incident thereupon exceeds the retaining force of the clips 26.

Figure 5:
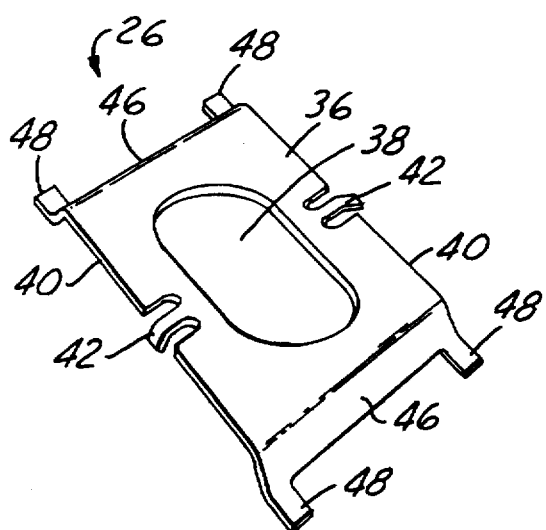
FIG. 5. is a perspective view of a deployable clip according to the present invention.
Figure 6:
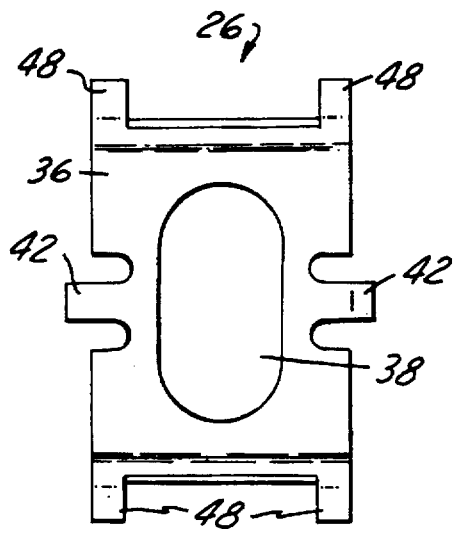
FIG. 6 is a top view of the clip shown in FIG. 5.
Figure 7:
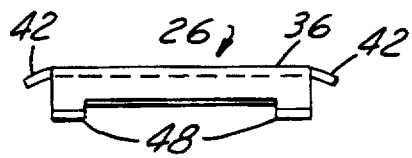
FIG. 7 is an end view of the clip of FIG. 5.
Figure 8:
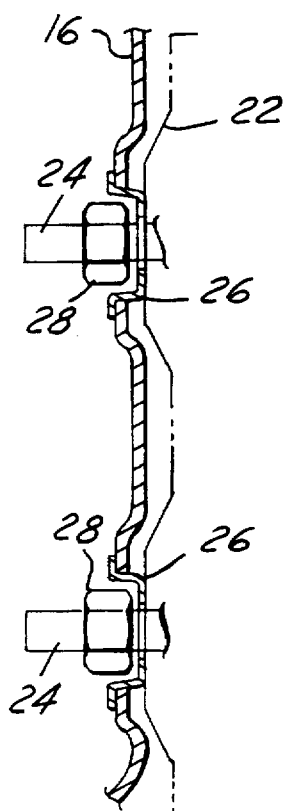
FIG. 8 is a sectional view showing attachment of an electronics module to the bracket.
Figure 9:
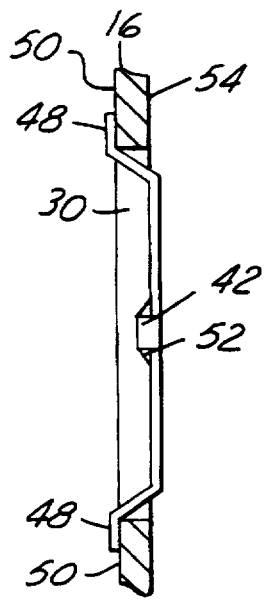
FIG. 9 is a sectional view showing attachment of a deployable clip to a bracket.
Figure 10:
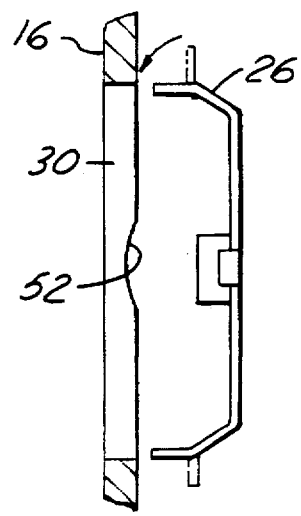
FIG. 10 is side view of a deployable clip shown after deployment of an electronics module from an instrument panel bracket.

The retaining force of the clips 26 is determined by the construction thereof. A preferred embodiment of a clip 26 for use in the present invention is shown in FIGS. 5 through 7. The clip 26 has a base member 36 with a slot 38 in a center portion thereof for receiving the bolt 24 therethrough. Along sides 40 of the base member 36 are a pair of finger 42. On each end 46 of base member 36 is a pair of tabs 48 elevationally spaced therefrom. The finger 42 and the tabs 48 cooperate to retain the base member 36 within an opening 30 of the bracket 16 as depicted in FIGS. 8 and 9. More specifically, as seen in FIG. 9, the tabs 48 abut an outer surface 50 of the bracket 16, while the fingers 42 mate in depressions 52 on an opposite side 54 of bracket 16. When a force sufficient to overcome the retaining force of the clip 26 within the opening 30 is incident upon the electronics module 22, the tabs 48 are bent as shown in FIG. 10 to allow the clip 26 to pass therethrough so that the electronics module 22 may deploy from the bracket 16 (FIG. 4). Those skilled in the art will recognize that other frangible means may be used to affect separation of the electronics module 22 from the bracket 16 in response to imposition of a load in excess of a predetermined magnitude on the instrument panel 10. Those skilled in the art will also recognized that the electronics module 22 may be directly attached to the instrument panel 10 in a fashion similar to the attachment herein described to the bracket 16.

The shape, thickness, width and material composition of the clips 26, as well as the number of clips 26 employed, will partially determine the load required to effect separation of the electronics module 22 from the bracket 16. Electronics modules of different weights can be accomodated by varying the number and location of the clips 26 on bracket 16. Construction of the deployable electronics module assembly 12 of the present invention is such that deployment of the electronics module will occur in response to both axial and angular loads. That is, the clips 26 will release under both direct loads and shear loads.

The bracket 16 is shown in further detail in FIGS. 11 and 12. In FIG. 11, the bracket 16 is shown having an access opening 34 in a center section thereof for receiving the access cap 32 of the electronics module 22. Fastener holes 56 on peripheral areas of the bracket 16 receive conventional fasteners for attachment of the bracket to the instrument panel 10. In a plate portion 58 of the bracket 16 are the openings 30 which receive the frangible clips as described above. A pair of tabs 60, 62 located above and below, respectively, the access opening 34 (FIG. 11), cooperate with corresponding snap 64 on the electronics module 22 (FIG. 4).

Although the preferred embodiment of the present invention has been disclosed, various changes and modifications may be made thereto by one skilled in the art without department from the scope and spirit of the invention as set forth in the appended claims.

We claim:

1. A deployable electronics module assembly for an instrument panel of an automotive vehicle, the assembly comprising:

an electronics module;

a plurality of clips adapted to be received in a corresponding plurality of clip openings in said instrument panel for attachment with the electronics module assembly so as to require a predetermined load to release said plurality of clips from said plurality of openings, wherein each of said plurality of clips comprises a base member, at least one finger extending from said base member, and at least two tabs elevationally spaced with respect to said base member and cooperating with said finger to retain said base member in one of said plurality of clip openings; and fastener means for connecting said plurality of clips to said electronics module such that said fastener means move through said plurality of clip openings upon application of a load in excess of said predetermined load against the instrument panel so as to deploy the electronics module away therefrom; and wherein said at least two tabs of each of said plurality of clips is bent upon application of said predetermined load to said instrument panel to allow said plurality of clips and said fastener means to move through said plurality of clip openings.

2. An assembly according to claim 1 wherein said base member has a retainer opening therethrough for receiving said fastener means therein.

3. An assembly according to claim 2 wherein said fastener means comprises a nut and bolt combination for each of said plurality of clips.

4. An assembly according to claim 1 wherein said plurality of clips is made from a metal material.

5. A deployable electronics module assembly for an instrument panel of an automotive vehicle, the assembly comprising:

an electronics module;

a bracket adapted to be mounted, to the instrument panel for attachment with said electronics module assembly;

at least three clips received in at least three corresponding clip openings on the bracket so as to require a predetermined load to release the at least three clips from the at least three openings, wherein each of the at least three clips comprises a base member, at least two fingers extending from the base member, and at least four tabs elevationally spaced with respect to the base member and cooperating with the at least two fingers to retain the base member in one of the at least three clips opening; and at least three fasteners correspondingly connected through each of the at least three clips to the electronics module so as to move through the clip openings upon application of a load equal to or in excess of the predetermined load against the instrument panel so as to deploy the electronics module away therefrom; and wherein each of the least four tabs of each of the at least three clips is bent upon application of the predetermined load to the instrument panel to allow the at least three clips and the at least three fasteners to move through the at least three clip openings.

6. An assembly according to claim 5 wherein the base member has a slot therethrough for receiving one of the at least three fasteners therein.

7. An assembly according to claim 5 wherein the at least three fasteners each comprise a nut and bolt combination.

8. An assembly according to claim 5 wherein the at least three clips are made from a metal material.

9. A deployable electronics module assembly for an instrument panel of an automotive vehicle, the assembly comprising:

a bracket adapted to be mounted to the instrument panel for attachment with the electronics module assembly; and an electronics module mounted to the bracket with bendable means operative to effect separation of the electronics module from the bracket in response to imposition of a load in excess of a predetermined magnitude, wherein the bendable means comprises:

a plurality of clips received in a corresponding plurality of clip openings in the bracket so as to require the load in excess of the predetermined magnitude to release the plurality of clips from the plurality of openings; and fastener means for connecting said plurality of clips to said electronics module such that said fastener means move through said plurality of clip openings upon imposition of the load in excess of the predetermined magnitude against the instrument panel so as to deploy the electronics module away therefrom; and wherein each of the plurality of clips comprises a base member, at least one finger extending from the base member, and at least two tabs elevationally spaced with respect to the base member and cooperating with the finger to retain the base member in one of the plurality of clip openings; and wherein the at least two tabs of each of the plurality of clips is bent upon application of a load in excess of a predetermined magnitude to the instrument panel to allow the plurality of clips and the fastener means to move through the plurality of clip openings.

10. An assembly according to claim 9 wherein the bracket has an access opening therein for receiving an electronics cap section of the electronics module therethrough to allow access to electronics components within the module.

* * * * *